United States Patent
Shafi et al.

(10) Patent No.: US 8,812,734 B2
(45) Date of Patent: Aug. 19, 2014

(54) NETWORK FEED CONTENT

(75) Inventors: Naji S. Shafi, Seattle, WA (US); Jesse G. Tobiason, Redmond, WA (US)

(73) Assignee: Microsoft Corporation, Remond, WA (US)

( * ) Notice: Subject to any disclaimer, the term of this patent is extended or adjusted under 35 U.S.C. 154(b) by 0 days.

(21) Appl. No.: 12/873,698

(22) Filed: Sep. 1, 2010

(65) Prior Publication Data

US 2012/0054369 A1    Mar. 1, 2012

(51) Int. Cl.
   *G06F 15/16* (2006.01)
(52) U.S. Cl.
   USPC .......................................... 709/246; 709/206
(58) Field of Classification Search
   CPC ..... H04L 67/20; H04L 65/602; H04L 67/327; G06F 17/30867; G06F 17/3089; G06F 17/30893; G06Q 30/02
   See application file for complete search history.

(56) References Cited

U.S. PATENT DOCUMENTS

| | | | |
|---|---|---|---|
| 7,761,787 B2 | 7/2010 | Singleton et al. | |
| 2003/0051055 A1 | 3/2003 | Parrella et al. | |
| 2004/0107439 A1* | 6/2004 | Hassell et al. | 725/44 |
| 2005/0192948 A1 | 9/2005 | Miller et al. | |
| 2005/0210017 A1* | 9/2005 | Cucerzan | 707/3 |
| 2006/0020596 A1 | 1/2006 | Liu et al. | |
| 2006/0026067 A1* | 2/2006 | Nicholas et al. | 705/14 |
| 2007/0050175 A1* | 3/2007 | Schmelzer et al. | 702/186 |
| 2008/0294607 A1 | 11/2008 | Partovi et al. | |
| 2009/0024915 A1* | 1/2009 | Cudich et al. | 715/234 |
| 2009/0030669 A1 | 1/2009 | Dapkunas | |
| 2009/0055460 A1* | 2/2009 | Hicks et al. | 709/201 |
| 2009/0239557 A1 | 9/2009 | Kadakia et al. | |
| 2009/0313536 A1 | 12/2009 | Karidi et al. | |
| 2010/0107091 A1 | 4/2010 | Amsterdam et al. | |
| 2010/0306049 A1* | 12/2010 | Kakade et al. | 705/14.49 |

FOREIGN PATENT DOCUMENTS

| | | |
|---|---|---|
| CN | 101110080 | 1/2008 |
| CN | 101183394 | 5/2008 |

OTHER PUBLICATIONS

"Using CSS to Replace Text with Images", Retrieved at <<http://www.justsoftwaresolutions.co.uk/webdesign/css-image-replacement-techniques.html>>, Oct. 29, 2007, pp. 3.
"Feed-buster", Retrieved at <<http://code.google.com/p/feed-buster/>>, Aug. 6, 2010, pp. 4.
"International Search Report", Mailed Date: Feb. 28, 2012, Application No. PCT/US2011/045774, Filed Date: Jul. 28, 2011, pp. 8.
"Foreign Office Action", Chinese Application No. 201110266585.8, (Jun. 25, 2013), 6 Pages.
"Foreign Office Action", Chinese Application No. 201110266585.8, (Aug. 31, 2012), 9 pages.

* cited by examiner

*Primary Examiner* — Peling Shaw
(74) *Attorney, Agent, or Firm* — Sung Kim; Andrew Sanders; Micky Minhas

(57) ABSTRACT

Network feed content is described. In implementations, a network feed is parsed to locate one or more keywords. Additional content that corresponds to the one or more keywords is added to the network feed. The network feed having the additional content is communicated for receipt via a network by one or more users.

20 Claims, 4 Drawing Sheets

NETWORK FEED CONTENT

The ways in which information is available to users is ever increasing. For example, users traditionally obtained most of their information (e.g., news) from newspapers and broadcast media. With the advent of the Internet, however, users may actively search out information that may be of interest to them.

One such technique involves network feeds, such as RSS feeds, feeds obtained from social network services, and so on. Network feeds typically employ a standardized format to enable clients to receive information in a timely manner. For example, a person may receive a network feed from a social network service to view status updates, wall postings, and other information from friends of the user. Likewise, a person may subscribe to an RSS feed to obtain news articles, sports information, and so on.

However, the formats employed by typical network feeds were often static and therefore limited the amount of information conveyed in the feed. Thus, a user that may consume the network feed may be forced to manually locate additional information to fully realize the potential of the network feed, which may be frustrating and time consuming to the user.

SUMMARY

Network feed content is described in a variety of examples. In implementations, a network feed is parsed to locate one or more keywords. Additional content that corresponds to the one or more keywords is added to the network feed. The network feed having the additional content is communicated for receipt via a network by one or more users.

In implementations, one or more keywords in a network feed are replaced with content that corresponds to the keywords. The network feed having the content is published for receipt by one or more subscribers to the network feed.

In implementations, a system comprises one or more modules implemented at least partially in hardware to fetch network feeds, parse the fetched network feeds to determine which people, places, occasions, or things that are relevant to the network feed, find content based on the determined relevancy, and configure the network feed to include the found content.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Network feeds such as social networking and RSS feeds typically contain a large amount of static content, such as text of an article, status updates from a friend of a user, posts to a wall, and so on. This static content may reference people (e.g., artists, celebrities, athletes), occasions (e.g., events such as concerts, birthdays, and so on), places (e.g., restaurants, attractions) and things (e.g., albums, products). However, if the person consuming the feed desires additional information about this static content (e.g., the references to particular people, places, or things), the user may be forced to search, browse, or lookup information that is mentioned on the feed by launching a separate application, which may be both frustrating and time consuming.

Techniques involving network feed content are described. In implementations, a service backend "in the cloud" may be leveraged to preprocess traditional static feeds to create a rich feed having additional content. For example, the service may fetch the original network feed and identify people, places and things that are popular. The service may then locate relevant content based on this identification and include it in the network feed, such as an image, link, and so on. In this way, the service may create a "rich feed" that may be sent to the user to create a user experience having increased functionality. Further discussion of network feed content techniques may be found in relation to the following sections.

In the following discussion, an example environment is first described that is operable to perform network feed content techniques in the context of a social network service. However, it should be readily apparent that these techniques may be employed by a variety of different network feeds, such as RSS feeds without departing from the spirit and scope thereof. Example procedures are then described which may be employed by the example environment. It should also be readily apparent that the example environment is not limited to performing the example techniques and the example techniques are not limited to performance in the example environment.

Example Environment

Figure 1:
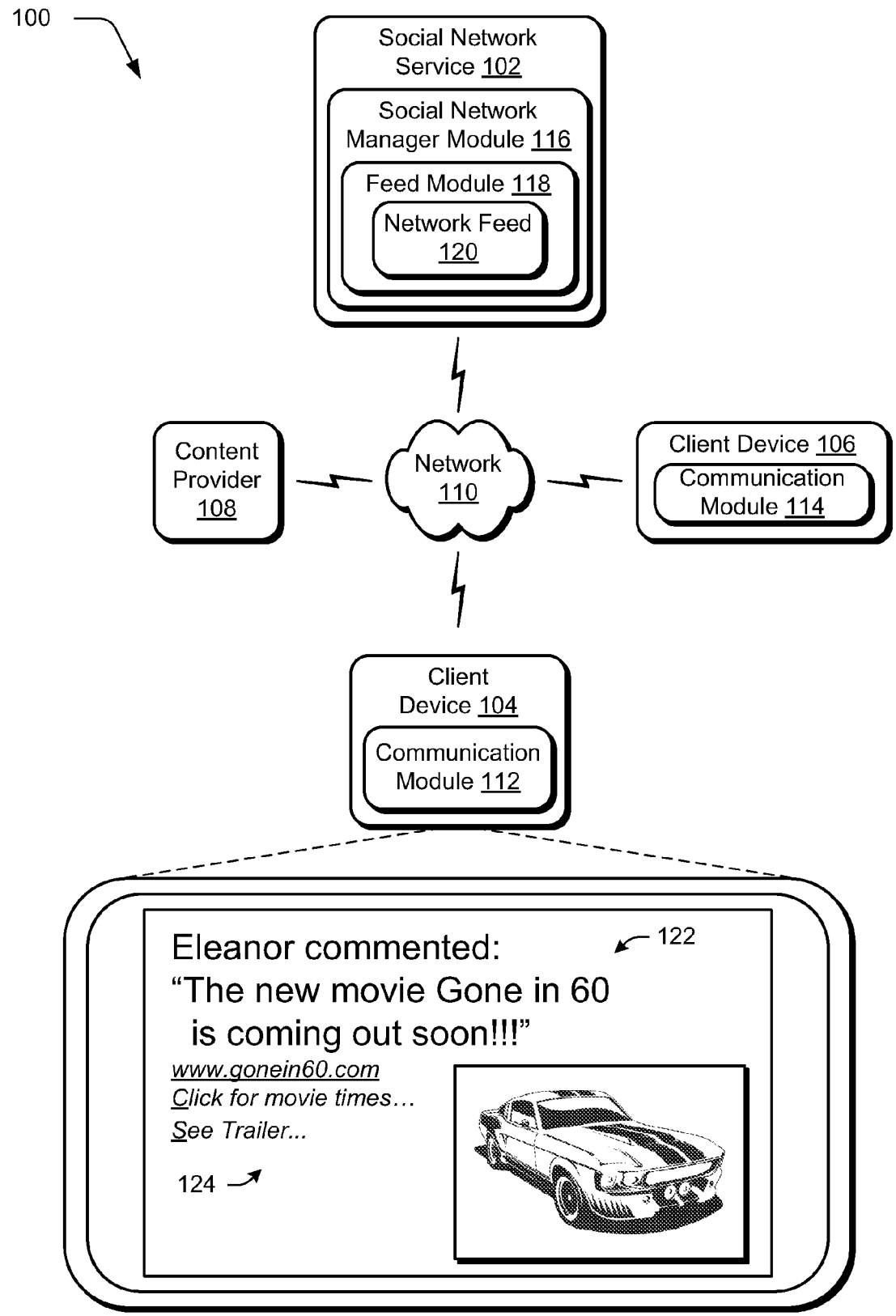
FIG. 1 is an illustration of an environment in an example implementation that is operable to perform network feed content techniques.

FIG. 1 is an illustration of an environment 100 in an example implementation that is operable to employ network feed techniques in a social network service. The illustrated environment 100 includes a social network service 102, a client device 104, another client device 106, and a content provider 108, each of which are communicatively coupled, one to another, over a network 110.

The client devices 104, 106 may be configured in a variety of ways. For example, the client devices 104, 106 may be configured as a computing device that is capable of communicating over the network 110, such as a desktop computer, a mobile station, an entertainment appliance, a set-top box communicatively coupled to a display device, a wireless phone, a game console, and so forth. Thus, the client devices 104, 106 may range from full resource devices with substantial memory and processor resources (e.g., personal computers, game consoles) to low-resource devices with limited memory and/or processing resources (e.g., traditional set-top boxes, hand-held game consoles). The client devices 104, 106 may also relate to an entity that operates the client device 104, 106, e.g., software.

Although the network 110 is illustrated as the Internet, the network may assume a wide variety of configurations. For example, the network 110 may include a wide area network (WAN), a local area network (LAN), a personal area network (PAN), a wireless network, a public telephone network, an intranet, and so on. Further, although a single network 110 is shown, the network 110 may be configured to include multiple networks.

The client devices 104, 106 are each illustrated as including a respective communication module 112, 114. The communication modules 112, 114 are representative of functionality of the respective client devices 104, 106 to communicate via the network 110. For example, the communication modules 112, 114 may include browser functionality to interact with the social network service 102 via the network 110, may include network feed reader functionality to consume network feeds such as Really Simple Syndication (RSS) feeds and social network feeds, and so forth.

The social network service 102 may support a variety of different functionality which is represented by the social network manager module 116. Through the social network manager module 116, for instance, the social network service 102 may support communication of status updates between the client device 104 and another client device that have been specified as friends of each other. Additionally, the specified "friendship" of the social network service 102 may be used as a basis to permit sharing of photos, video, blogs, and so on. Thus, the social network service 102 may use the friend relationship as a technique to permit or restrict access to content associated with a user's account of the social network service 102.

For instance, the client device 102 may be associated with a user's account of the social network service 102. Through this user account, the client device 104 may be used to specify a friend, such as a user account of the social network service 102 that is accessible via another client device, e.g., client device 106. By doing this, the client device 104 is permitted to access content associated with the other client device 106, such as content associated with an account of the social network service 102 of a user of the client device 104 that provided credentials to access the user account. Although a permission system involving friends has been described, it should be readily apparent that the social network service 102 may be configured in a variety of ways to support communication between users. For example, the social network manager module 116 may support blogging and micro-blogging (e.g., having a limited number of characters such as 140) to communicate status updates to subscribers of a particular user, e.g., via the social network service 102 (e.g., an email), via a SMS, and so on.

The social network service 102, and more particularly the social network manager module 116, is also illustrated as including a feed module 118 that is representative of functionality regarding a network feed 120. The feed module 118 may be implemented in a variety of different ways and thus is not limited to implementation by the social network service 102, further discussion of which may be found in relation to FIG. 2.

The feed module 118, for instance, may be configured to create the network feed 120 by collecting content that is generated by users of the social network service 102. The user-generated content may take a variety of forms, such as a message (e.g., email), posting, status update, link, media file, and so on. An example of user generated content 122 is illustrated as being output as part of the network feed 120 by the client device 104, which in this instance is a status updates that states "The new movie Gone in 60 is coming out soon!!!"

The feed module 118 is also configured to locate additional content for inclusion in the network feed 120. For example, the feed module 118 may be executed to locate content 124 that is likely relevant to the user generated content 122. For example, the feed module 118 may locate content 124 from the content provider 108 that is relevant to the user-generated content 122. In this instance, the content 124 includes a link to a website of a movie, a link to movie times for the movie described in the user-generated content 122, a link to a trailer, and an image taken from the movie. Thus, the feed module 118 may supplement the network feed 120 with additional content 124 located from a content provider 108. As stated above, the network feed may originate from a variety of different sources, such as a newspaper feed, a retailer-s shopping site (e.g., to replace a reference to jeans with an image of jeans), and so on. Additionally, a variety of different techniques may be employed to locate content and include the located content in the network feed 120, further discussion of which may be found in relation to the following figure.

Figure 2:
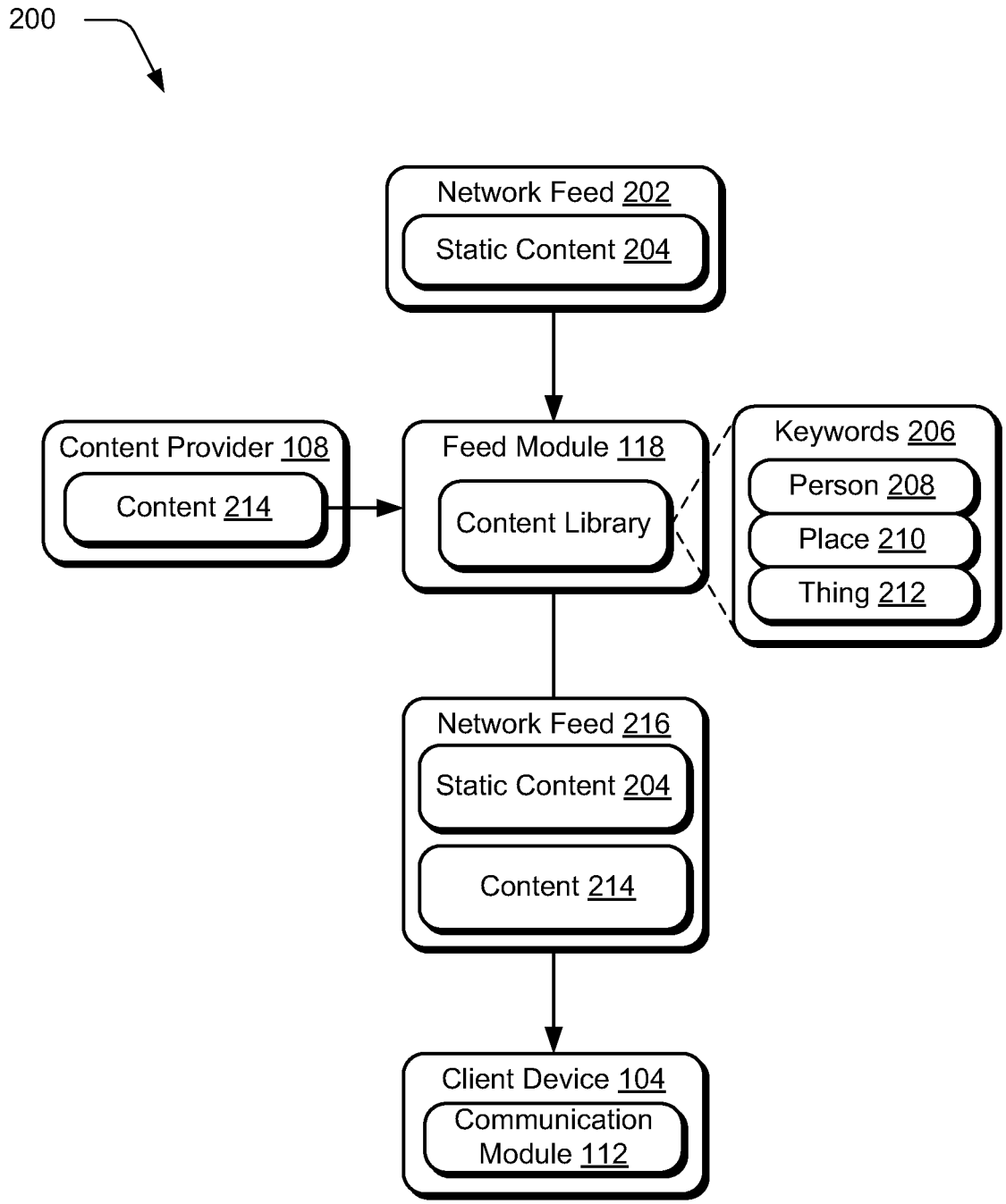
FIG. 2 illustrates a system in an example implementation in which content is found by a feed module of FIG. 1 to supplement a static feed.

FIG. 2 illustrates a system 200 in an example implementation in which content is found by a feed module 118 to supplement a static feed. In this instance, the feed module 118 is shown alone to illustrate that the feed module 118 may be implemented in a variety of different ways, such as by the social network service 102 of FIG. 1, as a stand-alone service, by the client devices 104, 106, and so on.

In this example, the feed module 118 receives a network feed 202 having static content 204, such as from a social network service, a service provider of an RSS feed, from another client device 106, and so on. The feed module 118 then examines the network feed 202 using a content library that references one or more keywords 206. For example, the feed module 118 may look for keywords that pertain to a person 208 (e.g., artists, celebrities, athletes), place 210 (e.g., restaurants, attractions), or thing 212 (e.g., albums, products). Other keywords may also be supported, such as misspelled words, synonyms, similar phrases, occasions, and so forth. These keywords 206 may therefore serve as a basis to locate content 214 from a content provider 108 that is relevant to the static content 204.

The feed module 118 may configure the network feed 216 to include the static content 204 as well as content 214 obtained from the content provider 108 based on the keywords 206. This network feed 216 may then be published for receipt by one or more client devices, such as the client device 104 which may use network feed reader functionality of the communication module 112 to consume the network feed 216. The content 214 may be included in the network feed 216 using a variety of techniques, an example of which may be found in relation to the following figure.

Figure 3:
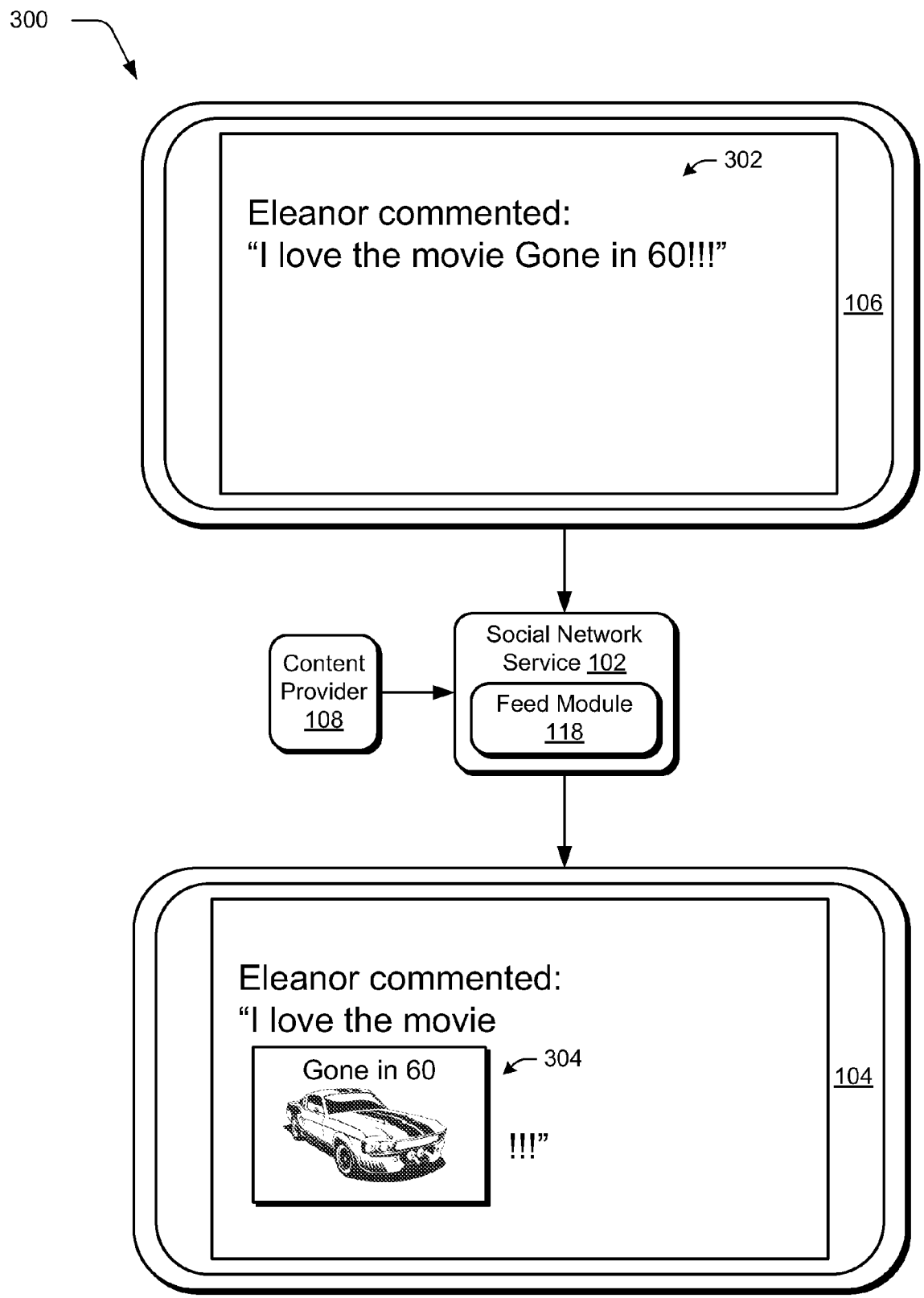
FIG. 3 illustrates a system in an example implementation in which static content is replaced with additional content in a network feed.

FIG. 3 depicts a system 300 in an example implementation in which static content is replaced with additional content in a network feed. In the example environment 100 of FIG. 1, additional content 124 that included links and images was added to a static network feed to provide additional functionality. In this instance, however, content obtained from a content provider is used to replace one or more items of user-generated content in the network feed.

A client device 106 is illustrated as having formed a status update 302 "I love the movie Gone in 60!!!" The client device 106 may then post the status update 302 for publishing by the social network service, 102, such as by utilizing communication module 114 functionality.

Upon receipt to the status update 302, the feed module 118 parses the update to locate keywords of interest, such as through use of a content library 204 as previously described, by performing a search of the network 110, and so on. In this instance, the feed module 118 determines that the name of a movie is mentioned in the status update 302 and accordingly locates content 304 from a content provider 108 to replace at least a portion of the status update. For example, the feed module 118 may replace the text "Gone in 60" with an image of a movie poster from the movie. Therefore, the client device 104 that receives the network feed from the social network service 102 may view both static content from the status update 302 as well as "rich" content (e.g., the image) obtained from the content provider 108.

The feed module 118 may support a wide variety of functionality. For example, the feed module 118 may configure the feed such that a user is allowed to highlight a series of words or a particular word and then launch a subsequent search for that word. For example, Anna may see the following in her social network feed, "IHT is a great paper" but be unsure as to what IHT means. Accordingly, Anna may highlight the word "IHT" and then "press & hold" the highlighted text. After the press and hold is triggered, a window may pop-up to display the top results of an Internet search for "IHT."

This user interaction may also serve as a basis for future replacements in the network feed. For example, the content library of FIG. 2 may be used to track that Anna has highlighted IHT and clicked on the iht.com website link from the multiple search results. Thus, the content library of FIG. 2 may also serve as a database based on user suggested links between terms and additional content that may be added to the network feed.

This use of user-suggested links may also provide other functionality. For example, Anna may see the following in a social network feed, "Drake is a great artist." Anna may then "click" on the word Drake, but is then led to Drake University instead of Drake the musician. In this example, functionality may be employed such that Anna may specify that this was an incorrect link by providing a technique to indicate this, e.g., using a "This is not what I was looking for" button on the page/content that was auto-linked. By clicking on that button, Anna may be redirected to a page with the top search results for Drake and her choice may be tracked for future usage. For example, after clicking "This is not what I was looking for", Anna is lead to an Internet search result for Drake and there she may choose a link to the musician, which may then be tracked by the feed module 118 to improve future results and described in the heuristic techniques below.

The feed module 118 may also leverage detection of keywords in network feeds to create targeted ads. For example, the feed module 118 may create a user profile for particular consumers of the network feed through detection of particular words, e.g., fashion, jeans, and shoes in Anna's RSS feed, and target additional content (e.g., advertisements) based on the profile. Thus, the user profile may supply a "taste" (interests) graph for interests of a particular user. Further, a provider of the feed module 118 may charge a fee for detecting trademarks/names and for replacing it with rich content such as a logo or a link to a site.

The feed module 118 may also provide for optimized pre-preprocessing of the network feed. For instance, multiple users might subscribe to the same RSS feed. In this scenario, the feed may be processed a single time and saved for publishing to a plurality of different users. Further, the "taste graphs" previously described may also be leveraged with this technique to save rich network feeds that are targeted toward like consumers. Thus, the feed module 118 may provide a wide variety of different functionality with respect to network feeds, further discussion of which may be found in relation to the following procedures.

Generally, any of the functions described herein can be implemented using software, firmware, hardware (e.g., fixed logic circuitry), manual processing, or a combination of these implementations. The terms "module" and "functionality" as used herein generally represent software, firmware, hardware, or a combination thereof. In the case of a software implementation, the module or functionality represents program code that performs specified tasks when executed on a processor (e.g., CPU or CPUs). The program code can be stored in one or more computer readable memory devices, e.g., memory or other tangible media. The features of the notification techniques described below are platform-independent, meaning that the techniques may be implemented on a variety of commercial computing platforms having a variety of processors.

Example Procedures

Figure 4:
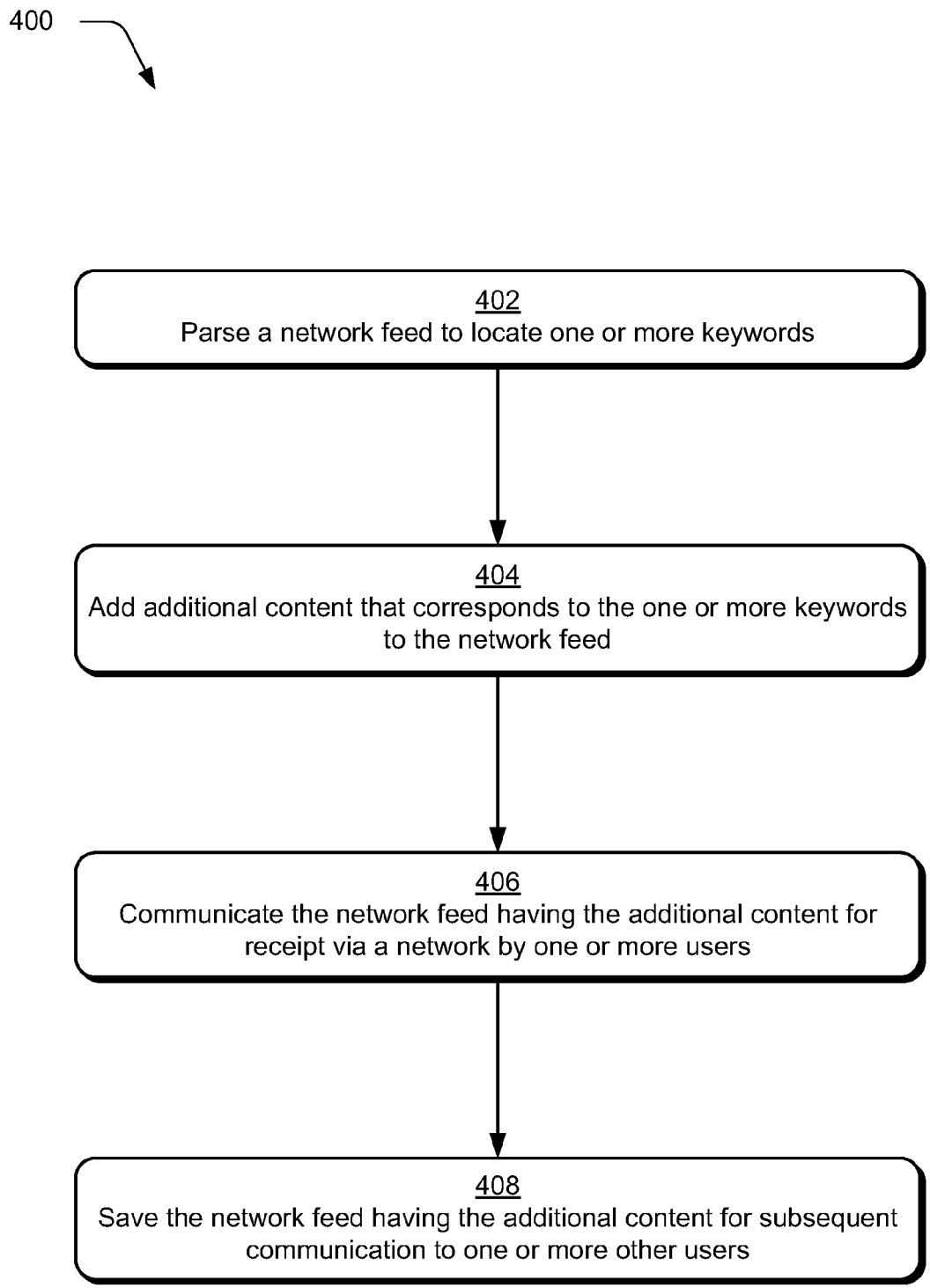
FIG. 4 is a flow diagram depicting a procedure in an example implementation in which additional content is located for inclusion in a network feed.

The following discussion describes network feed techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the example systems 200, 300 of FIGS. 2 and 3, respectively FIG. 4 depicts a procedure 400 in an example implementation in which additional content is located for inclusion in a network feed. A network feed is parsed to located one or more keywords (block 402). For example, a feed module 118 may receive a network feed 202 that includes static content, just as text, links, and so on in a social network service feed, an RSS feed, and so on.

Additional content is added to the network feed that corresponds to the one or more keywords to the network feed (block 404). The additional content may be located in a variety of ways, such as through user of user-specified links, links from advertisers, "what is popular now," results from Internet searches, and so on.

Further, this additional content may be maintained in a variety of ways, such as in a database that is local to an entity that executes the feed module 118, fetched remotely over the network 110, and so on. For example, the feed module 118 may keep a database of advertisements (e.g., company logos, movie posters, and so on) and common content local so as not the fetch the content in each instance. The feed module 118 may also obtain the content remotely, such as a result of an internet search or other query.

As previously described, the additional content may be chosen utilizing a variety of techniques. For example, the feed module 118 may use a description of tastes of prospective consumers of the network feed to determine which content should be added to the network feed. The feed module 118 may also leverage user-suggested links between keywords and additional content. For instance, the feed module 118 may determine that a misspelling is common and should refer to a particular item of content for inclusion in the network feed, such as typical text shorthand employed by users. A variety of other examples are also contemplated without departing from the spirit and scope thereof.

The network feed having the additional content is communicated for receipt via a network by one or more users (block 406), such as streamed for consumption using reader functionality of the communication module 112 of the client device 104.

The network feed having the additional content may also be saved for subsequent communication to one or more other users (block 408). As previously described, the network feed may be suitable for consumption by a variety of different consumers. Accordingly, the network feed may be saved and provided when requested to conserve resources of an entity that implements the feed module 118.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by one or more devices, the method comprising:
   parsing a network feed to locate one or more keywords;
   finding additional content that corresponds to the one or more keywords to the network feed, the additional content including an image or a link;
   replacing at least one said keyword of the parsed network feed with the additional content thereby removing the at least one said keyword from the network feed in place of the image or the link; and
   communicating the network feed having the additional content and not the replaced at least one said keyword for receipt via a network for output to one or more users.

2. A method as described in claim 1, wherein the network feed is provided by a social network service (SNS).

3. A method as described in claim 1, wherein the network feed is a Really Simple Syndication (RSS) feed.

4. A method as described in claim 1, wherein at least one item of additional content is an advertisement.

5. A method as described in claim 1, wherein the adding of the additional content is based at least in part on a description of tastes of the one or more users that are to receive the network feed.

6. A method as described in claim 1, wherein the finding of the additional content is based at least in part on user-suggested links between the one or more keywords and the additional content.

7. A method as described in claim 1, wherein at least one said keyword is a misspelling.

8. A method as described in claim 1, wherein at least one item of additional content is selectable to cause navigation to another item of content via the network.

9. A method as described in claim 1, further comprising saving the network feed having the additional content for subsequent communication to one or more other users.

10. A method as described in claim 1, wherein the adding of the additional content is based at least in part on user-suggested links between the one or more keywords and the additional content and a description of tastes of the one or more users that are to receive the at least one network feed.

11. A method comprising:
    replacing one or more keywords in a network feed, by one or more computing devices, with content that corresponds to the keywords, the replacing including removing at least one of the one or more keywords from the network feed and adding an image in place of the removed at least one keyword; and
    publishing the network feed having the content by the one or more computing device for receipt by one or more subscribers to the network feed.

12. A method as described in claim 11, wherein the one or more keywords includes a trademark and the content that replaces the trademark includes a logo or a selectable link.

13. A method as described in claim 11, wherein the network feed is provided by a social network service (SNS) or is an RSS feed.

14. A method as described in claim 11, wherein the content is an advertisement.

15. A method as described in claim 11, wherein the replacing is based at least in part on user-suggested links between the one or more keywords and the content.

16. A method as described in claim 11, wherein at least one said keyword is a misspelling.

17. A method as described in claim 11, wherein the content is selectable to cause navigation to another item of content via the network.

18. A system comprising one or more modules implemented at least partially in hardware to:
    fetch at least one network feed;
    parse the fetched at least one network feed;
    responsive to the fetched at least one network feed being parsed, replace one or more keywords in the fetched at least one network feed with content that corresponds to the one or more keywords, the content including a link and an image that each correspond to the one or more keywords being replaced;
    publish the at least one network feed to include the content and not the one or more keywords replaced by the content; and
    responsive to the at least one network feed being published with the content and without the one or more keywords replaced by the content, track an input associated with the content to improve subsequent replacement of the one or more keywords and additional content related to the one or more keywords.

19. A system of claim 18, wherein the at least one network feed is provided by a social network service (SNS) or is an RSS feed.

20. A system of claim 18, wherein the content of the published at least one network feed is selectable to invoke a search of the content.

* * * * *